US008422575B2

(12) United States Patent
Zheng

(10) Patent No.: US 8,422,575 B2
(45) Date of Patent: Apr. 16, 2013

(54) BROADCASTING SYSTEM AND MULTI-CARRIER COMMUNICATION SYSTEM

(75) Inventor: Yan-Xiu Zheng, Zhudong Township, Hsinchu County (TW)

(73) Assignee: Acer Incorporated, Taipei Hsien (TW)

( * ) Notice: Subject to any disclaimer, the term of this patent is extended or adjusted under 35 U.S.C. 154(b) by 307 days.

(21) Appl. No.: 12/884,849

(22) Filed: Sep. 17, 2010

(65) Prior Publication Data

US 2012/0069873 A1 Mar. 22, 2012

(51) Int. Cl.
*H04K 1/10* (2006.01)
(52) U.S. Cl.
USPC .......................................... 375/260; 370/252
(58) Field of Classification Search ........................ None
See application file for complete search history.

(56) References Cited

U.S. PATENT DOCUMENTS

| 2009/0041144 | A1* | 2/2009 | Biswas et al. ................. 375/260 |
| 2010/0056202 | A1* | 3/2010 | Li et al. ....................... 455/552.1 |
| 2010/0284487 | A1* | 11/2010 | Sumasu et al. ................ 375/295 |
| 2010/0311428 | A1* | 12/2010 | Zhang et al. .................. 455/447 |
| 2011/0044244 | A1* | 2/2011 | Etemad ......................... 370/328 |
| 2011/0255637 | A1* | 10/2011 | Murakami et al. ............ 375/299 |
| 2011/0261677 | A1* | 10/2011 | Kim et al. ..................... 370/210 |
| 2012/0044829 | A1* | 2/2012 | Piggin et al. ................. 370/252 |

* cited by examiner

*Primary Examiner* — Leon-Viet Nguyen
(74) *Attorney, Agent, or Firm* — McClure, Qualey & Rodack, LLP

(57) ABSTRACT

The invention provides a broadcasting system. In one embodiment, the broadcasting system comprises a transceiver and a processor. The transceiver carries out signal transmission via at least one fully configured carrier and at least one partially configured carrier. The processor controls the transceiver to broadcast a first preamble set via the at least one fully configured carrier, and controls the transceiver to broadcast a secondary preamble set via the at least one partially configured carrier, wherein the first preamble set comprises a primary preamble and at least one secondary preamble, and the second preamble set comprises no primary preamble and at least one secondary preamble.

22 Claims, 8 Drawing Sheets

BROADCASTING SYSTEM AND MULTI-CARRIER COMMUNICATION SYSTEM

BACKGROUND OF THE INVENTION

1. Field of the Invention

The invention relates to communication systems, and more particularly to multi-carrier communication systems.

2. Description of the Related Art

A multi-carrier communication system uses a plurality of carriers for signal transmission. The multiple carriers of the multi-carrier communication system are divided into fully configured carriers and partially configured carriers. A fully configured carrier carries complete system information. A partially configured carrier carries only partial system information. Referring to FIG. 1, a schematic diagram of a multi-carrier communication system is shown. In one embodiment, the multi-carrier communication system comprises a base station 102 and a mobile station 104. The base station 102 broadcasts signals via a plurality of fully configured carriers 1~M and a plurality of partially configured carriers 1~N.

When the mobile station 104 tries to access data of the multi-carrier communication system, because the partially configured carriers 1~N do not comprise complete network entry information, the mobile station 104 cannot directly access data via the partially configured carrier 1~N. On the contrary, the mobile station 104 must first accesses the fully configured carriers 1~M, and then obtain network entry information from one of the fully configured carriers 1~M, and then access data from the partially configured carriers 1~N according to the network entry information obtained from the fully configured carriers. Thus, to reduce network entry latency, the mobile station 104 must identify which one of the multiple carriers of the multi-carrier communication system is a fully configured carrier. Otherwise, if the mobile station 104 cannot identify whether a carrier is a fully configured carrier, when the mobile station 104 starts to enter the network of the multi-carrier communication system, the mobile station 104 spends a lot of time in accessing the partially configured carriers, while not obtaining information required for network entry; thus, resulting in a long network entry latency.

Preambles of a carrier comprise a lot of information for accessing the carrier. Preambles are divided into primary preambles and secondary preambles. A primary preamble may carry information about carrier bandwidth, sector number, type of a base station, and partial cell ID. A secondary preamble may carry cell ID information or partial cell ID information. A mobile station uses a primary preamble for symbol boundary detection, and a mobile station may use a secondary preamble as an indicator for radio signal strength.

The fully configured carriers 1~M and the partially configured carriers 1~N of a conventional multi-carrier communication system both have hierarchical preamble designs. Referring to FIG. 2, a schematic diagram of hierarchical preambles of a fully configured carrier and a partially configured carrier of a conventional multi-carrier communication system is shown. In one embodiment, each frame of the fully configured carrier comprises a primary preamble 202 and three secondary preambles 204, 206, and 208. In one embodiment, each frame of the partially configured carrier comprises a primary preamble 212 and three secondary preambles 214, 216, and 218. Thus, the fully configured carrier and the partially configured carrier have the same hierarchical preamble designs, and the mobile station 104 cannot differentiate the fully configured carrier from the partially configured carrier according to the preambles thereof.

Because preamble detection is a first step in a network entry procedure, if a mobile station can identify whether a carrier is a fully configured carrier or a partially configured carrier according to the preambles of the carrier, the mobile station can obtain network entry information from a fully configured carrier as soon as possible; thereby reducing network entry latency to improve performance of the mobile station. Thus, a new multi-carrier communication system comprising partially configured carriers with different preamble designs from those of fully configured carriers are provided.

BRIEF SUMMARY OF THE INVENTION

The invention provides a broadcasting system. In one embodiment, the broadcasting system comprises a transceiver and a processor. The transceiver carries out signal transmission via at least one fully configured carrier and at least one partially configured carrier. The processor controls the transceiver to broadcast a first preamble set via the at least one fully configured carrier, and controls the transceiver to broadcast a secondary preamble set via the at least one partially configured carrier, wherein the first preamble set comprises a primary preamble and at least one secondary preamble, and the second preamble set comprises no primary preamble and at least one secondary preamble.

The invention also provides a multi-carrier communication system. In one embodiment, the multi-carrier communication system comprises a plurality of carriers, a base station, and a mobile station. The plurality of carriers is divided into at least one fully configured carrier and at least one partially configure carrier. The base station broadcasts a first preamble set via the at least one fully configured carrier, and broadcasts a secondary preamble set via the at least one partially configured carrier, wherein the first preamble set comprises a primary preamble and at least one secondary preamble, and the second preamble set comprises no primary preamble and at least one secondary preamble. The mobile station selects a target carrier from the carriers, detects whether the primary preamble is received from the target carrier, and determines the target carrier to be the fully configured carrier when the primary preamble is detected from the target carrier.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
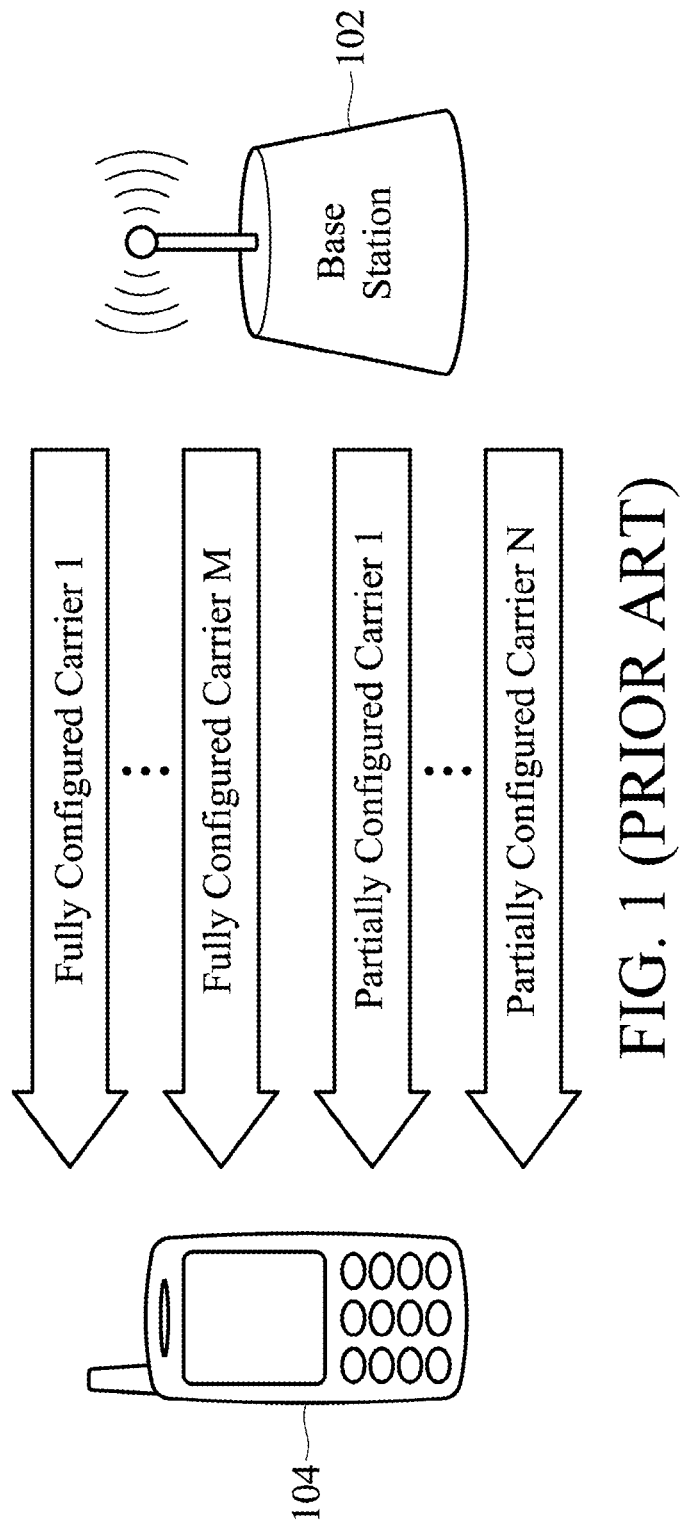
FIG. 1 is a schematic diagram of a multi-carrier communication system.
Figure 2:
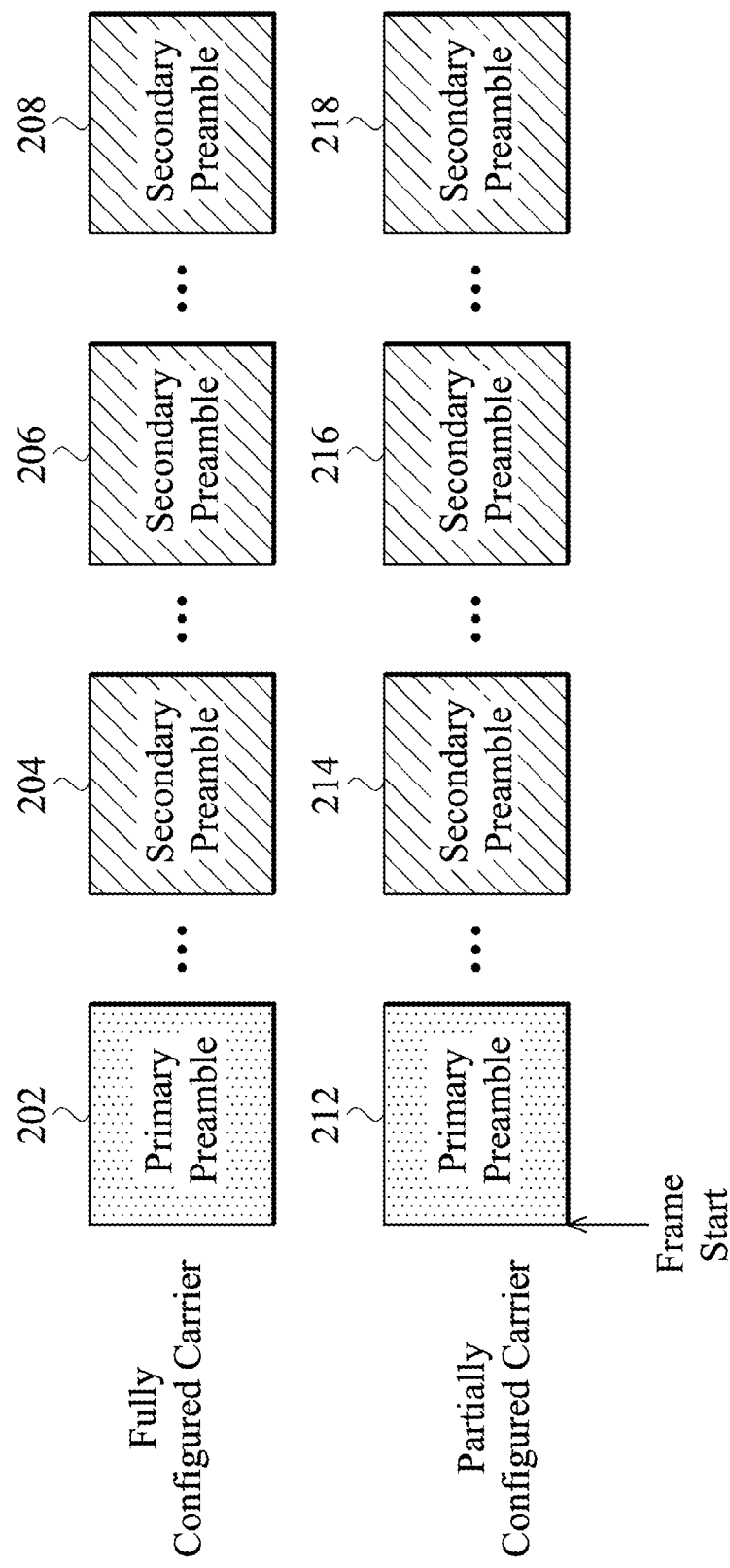
FIG. 2 is a schematic diagram of hierarchical preambles of a fully configured carrier and a partially configured carrier of a conventional multi-carrier communication system.
Figure 3:
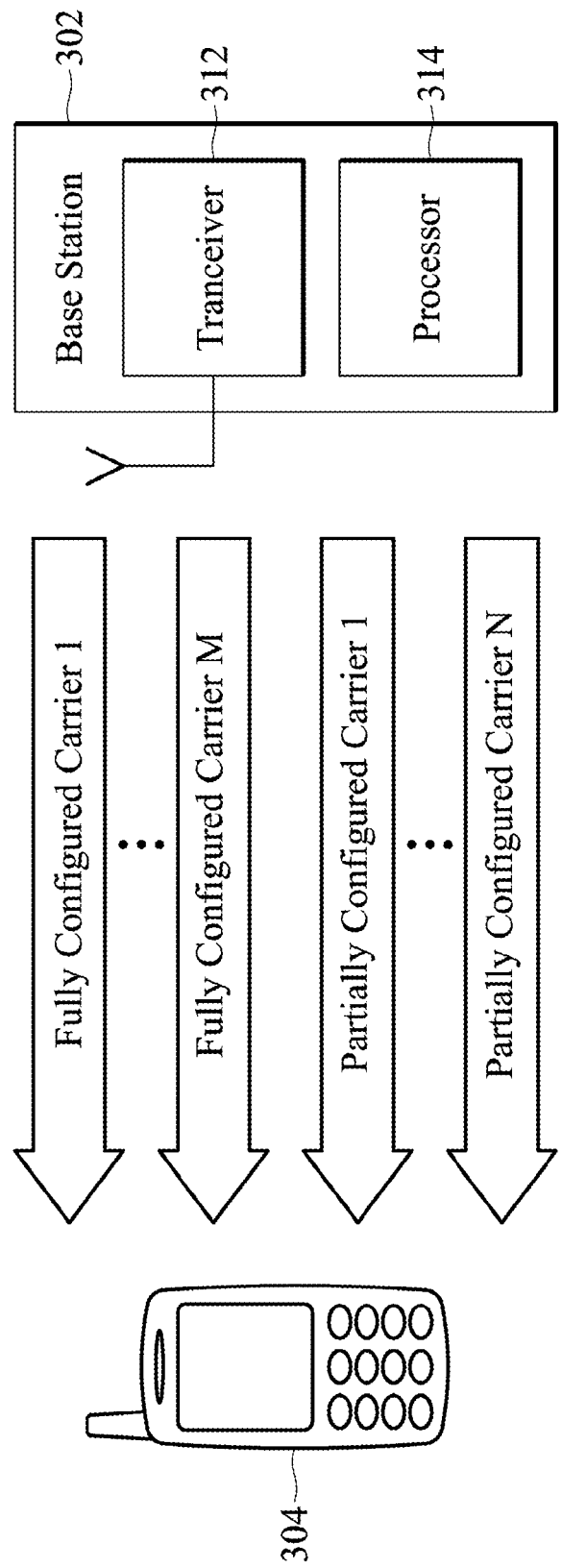
FIG. 3 is a block diagram of a multi-carrier communication system according to the invention.

Referring to FIG. 3, a block diagram of a multi-carrier communication system according to the invention is shown. In one embodiment, the multi-carrier communication system comprises a base station 302 and a mobile station 304. The base station 302 comprises a transceiver 312 and a processor 314. The transceiver 312 carries out signal transmission via a plurality of carriers, wherein the carriers comprises fully configured carriers 1~M and partially configured carriers 1~N. Each of the fully configured carriers 1~M comprises complete system information. On the contrary, the partially configured carriers comprise merely partial system information.

The processor 314 of the base station 302 controls the transceiver 312 to broadcast a first preamble set via each of the fully configured carriers 1~M, wherein the first preamble set comprises a primary preamble and at least one secondary preamble. In other words, the fully configured carriers 1~M have a hierarchical preamble design. The processor 314 of the base station 302 also controls the transceiver 312 to broadcast a second preamble set via each of the partially configured carriers 1~N, wherein the second preamble set comprises no primary preamble and at least one secondary preamble. In other words, the partially configured carriers 1~N do not have a hierarchical preamble design.

When the mobile station 304 tries to access data transmitted by the base station 302, the mobile station 304 can therefore identify whether a carrier is a fully configured carrier or a partially configured carrier according to the preambles of the carrier. The mobile station 304 first selects a target carrier from the plurality of the carriers of the multi-carrier communication system. The mobile station 304 then detects whether a primary preamble has been received from the target carrier. If a primary preamble is detected from the target carrier, the target carrier is identified as a fully configured carrier, and the mobile station 304 obtains network entry information from the fully configured carrier. If a primary preamble is not detected from the target carrier, the target carrier is identified as a partially configured carrier. The mobile station 304 then selects another carrier from the plurality of carriers to be a new target carrier, and detects whether a primary preamble has been received from the new target carrier to identify whether the new target carrier is a fully configured carrier, until a fully configured carrier is found and network entry information is obtained from the fully configured carrier. The multi-carrier communication system supports that a mobile station 304 leaves a partial configured carrier soon during network entry.

Figure 4:
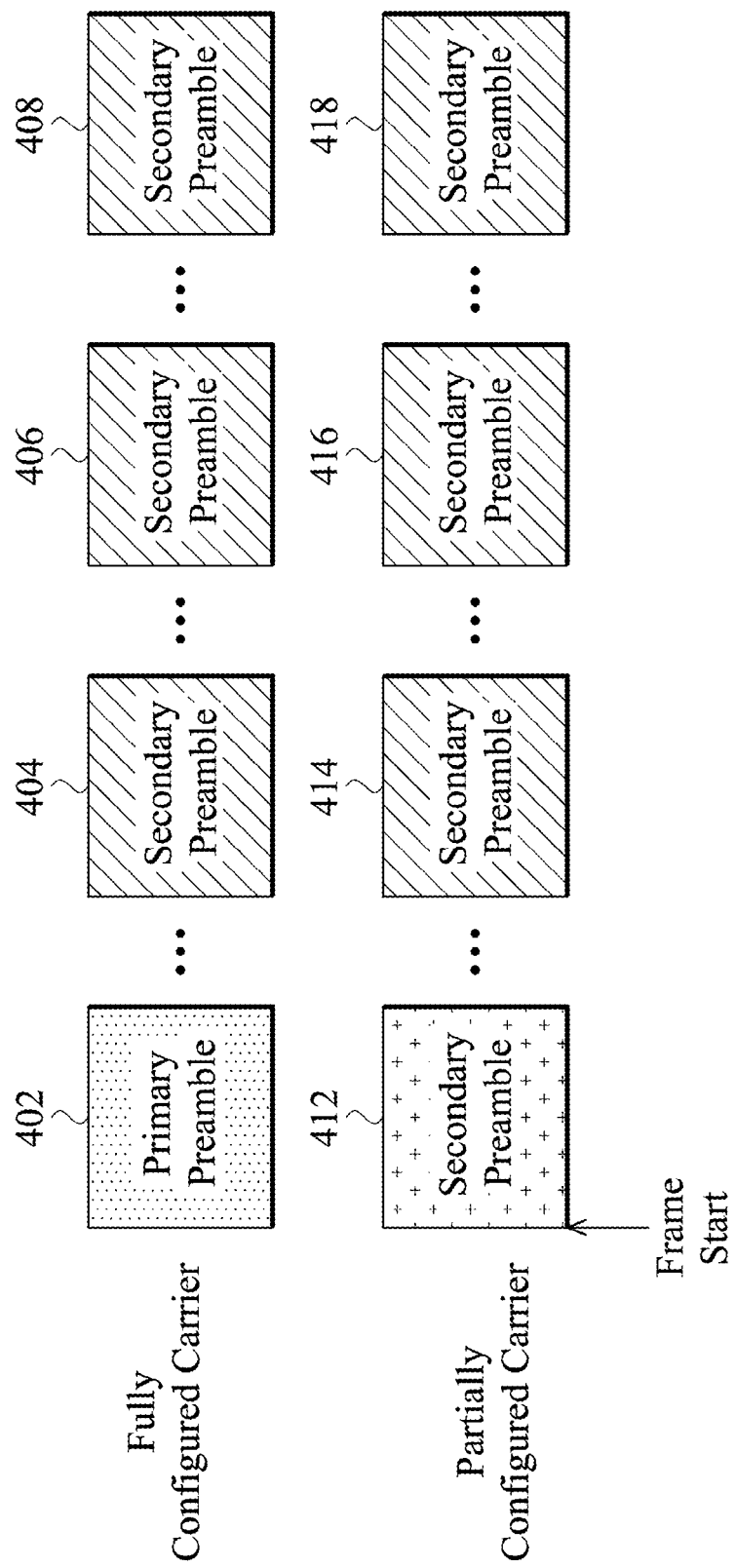
FIG. 4 is a schematic diagram of a first preamble set of a fully configured carrier and a second preamble set of a partially configured carrier according to the invention.

Referring to FIG. 4, a schematic diagram of a first preamble set of a fully configured carrier and a second preamble set of a partially configured carrier according to the invention is shown. In one embodiment, the base station 302 transmits the first preamble set in each frame of the fully configured carrier, and the first preamble set comprises a primary preamble 402 and three secondary preambles 404, 406, and 408. The primary preamble 402 is transmitted at a start of each frame. In one embodiment, the base station 302 transmits the second preamble set in each frame of the partially configured carrier, and the second preamble set comprises four secondary preambles 412, 414, 416, and 418. In one embodiment, the four secondary preambles 412, 414, 416, and 418 of the partially configured carrier are transmitted respectively in correspondence with the primary preamble 402 and the three secondary preambles 404, 406, and 408 of the fully configured carrier. In one embodiment, the secondary preamble 412 corresponding to the primary preamble 402 has a different code sequence with those of the secondary preambles 414, 416, and 418.

A primary preamble is used for timing synchronization and has different time domain characteristics from that of a secondary preamble. According to the IEEE 802.16m standard, the primary preamble 402 has a double repeated time-domain waveform characteristic, and the secondary preambles 404~408 of the fully configured carrier and the secondary preambles 412~418 of the partially configured carrier do not have the double repeated time-domain waveform characteristic. The mobile station 304 can therefore easily identify the primary preamble 402 from the secondary preambles 404~408 and 412~418 according to the double repeated time-domain waveform characteristic, and therefore easily determine whether a primary preamble is transmitted via a target carrier to determine whether the target carrier is a fully configured carrier.

In one embodiment, the primary preamble 402 and the secondary preambles 404~408 of the fully configured carrier is a Zadoff Chu code or a generalized chirp like code. In one embodiment, the primary preamble 402 is a frequency-domain interleaved preamble. The transceiver 312 may use MIMO-scheme cyclic delay diversity to generate the primary preamble 402 and the secondary preambles 404~408 of the fully configured carrier. The transceiver 312 may also use MIMO-scheme cluster-based phase rotation to generate the primary preamble 402 and the secondary preambles 404~408 of the fully configured carrier. The primary preamble 402 and the secondary preambles 404~408 of the fully configured carrier may be FDM/CDM based preambles.

In one embodiment, the secondary preamble 412~418 of the partially configured carrier is a Zadoff Chu code or a generalized chirp like code. The secondary preamble 412~418 of the partially configured carrier may have a triple repeated time-domain waveform characteristic or a quintuple repeated time-domain waveform characteristic. The transceiver 312 may use an MIMO-scheme cyclic delay diversity to generate the secondary preambles 412~418 of the partially configured carrier. The transceiver 312 may also use a frequency switching time division (FSTD) MIMO scheme to generate the secondary preambles 412~418 of the partially configured carrier.

Figure 5A:
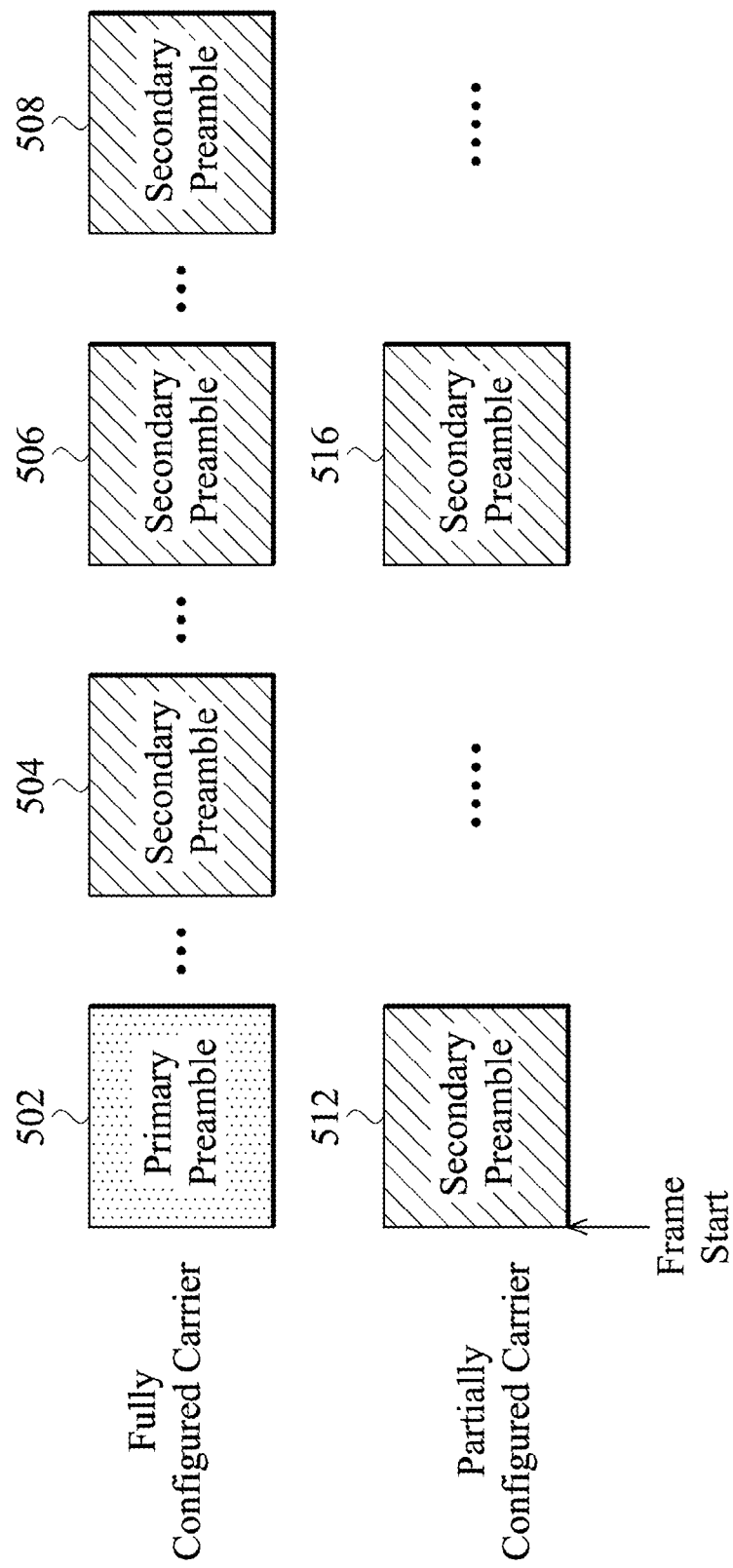
FIG. 5A is a schematic diagram of a second embodiment a second preamble set of a partially configured carrier according to the invention.

Referring to FIG. 5A, a schematic diagram of another embodiment a second preamble set of a partially configured carrier according to the invention is shown. A first preamble set of a fully configured carrier comprises a primary preamble 502 and three secondary preambles 504, 506, and 508. The second preamble set of the partially configured carrier, however, comprises only two secondary preambles 512 and 516. Because the partially configured carrier comprises a lesser number of secondary preambles, the mobile station 304 only needs to check two secondary preambles to identify a target carrier to be a partially configured carrier, and symbols are left for data transmission to increase system capacity. In FIG. 5A, the first secondary preamble 512 of the partially configured carrier is transmitted in correspondence with the primary preamble 502 of the fully configured carrier, and the second secondary preamble 516 of the partially configured carrier is transmitted in correspondence with a second secondary preamble 506 of the fully configured carrier.

Figure 5B:
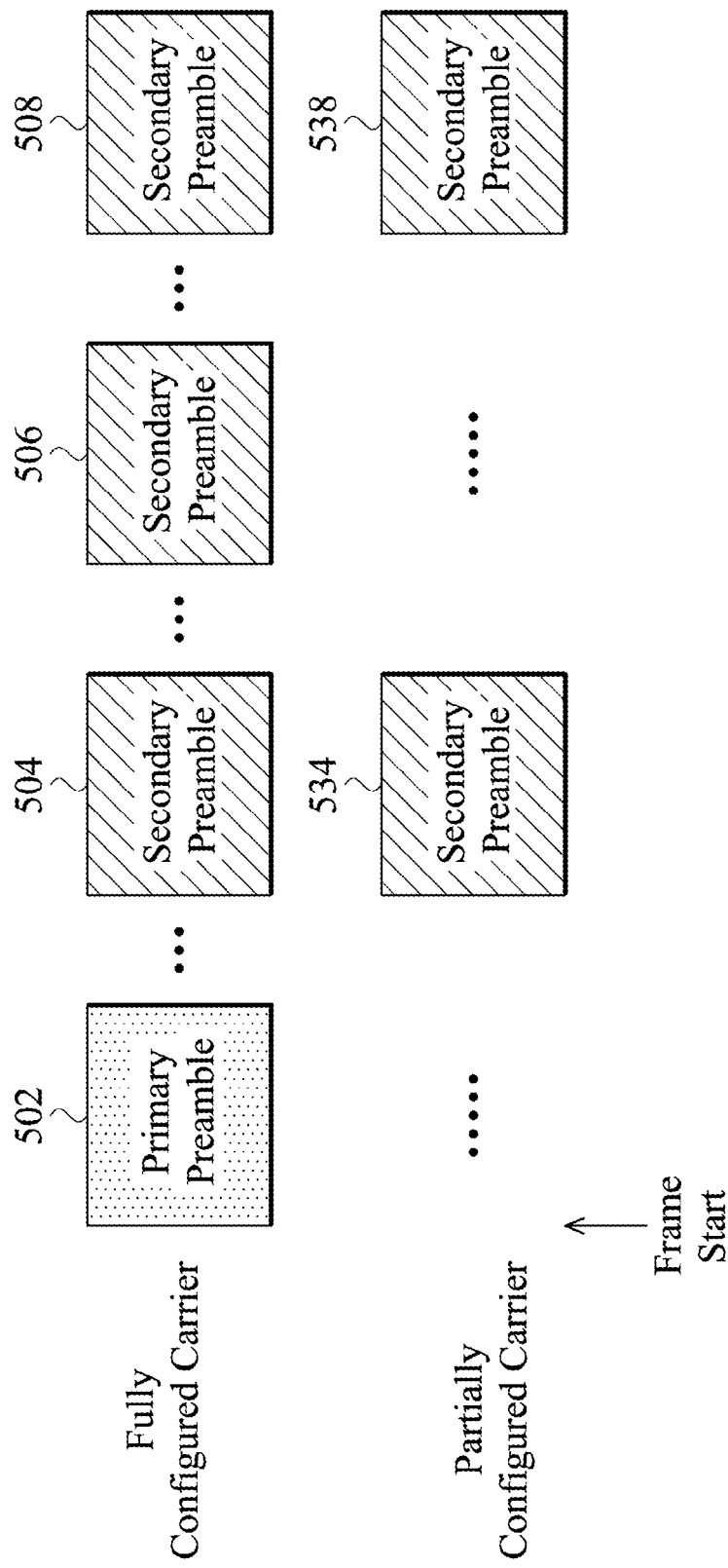
FIG. 5B is a schematic diagram of a third embodiment a second preamble set of a partially configured carrier according to the invention.

Referring to FIG. 5B, a schematic diagram of another embodiment of a second preamble set of a partially configured carrier according to the invention is shown. The second preamble set of the partially configured carrier comprises two secondary preambles 532 and 538. In FIG. 5B, the first secondary preamble 534 of the partially configured carrier is transmitted in correspondence with the first secondary preamble 504 of the fully configured carrier, and the second secondary preamble 538 of the partially configured carrier is transmitted in correspondence with the third secondary preamble 508 of the fully configured carrier.

Figure 5C:
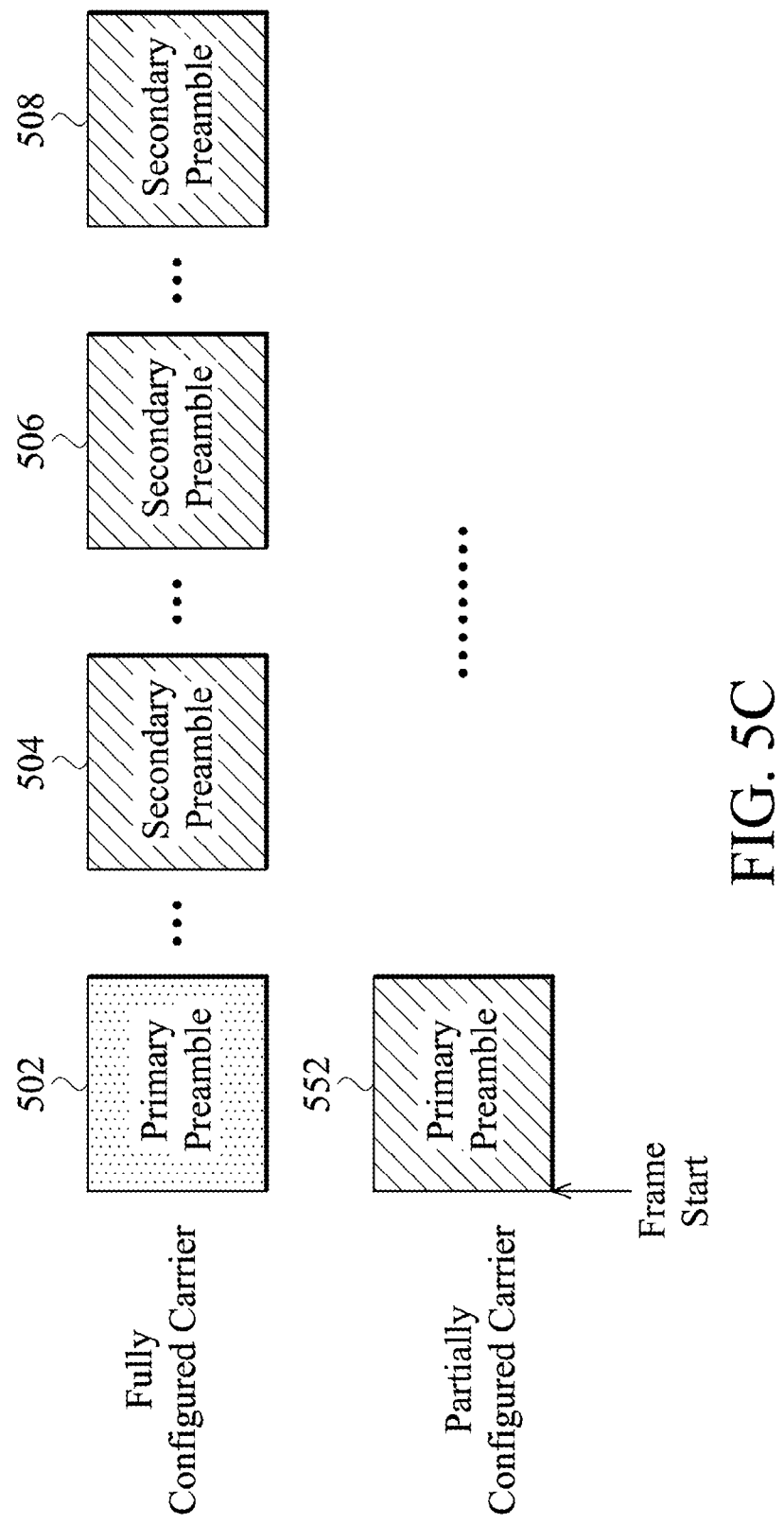
FIG. 5C is a schematic diagram of a fourth embodiment a second preamble set of a partially configured carrier according to the invention.
Figure 5D:
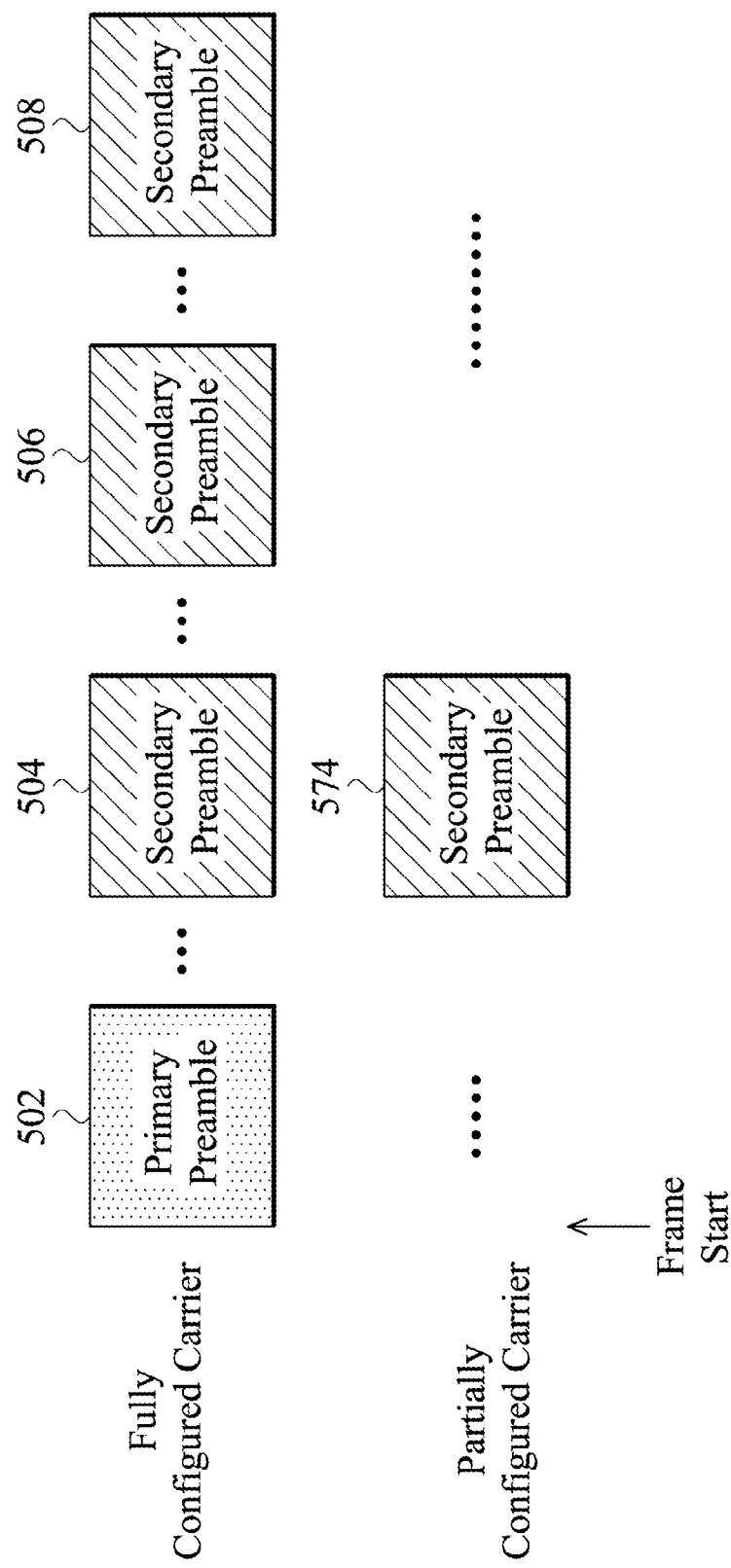
FIG. 5D is a schematic diagram of a fifth embodiment a second preamble set of a partially configured carrier according to the invention.

Referring to FIGS. 5C and 5D, schematic diagrams of embodiments of a second preamble set of a partially configured carrier according to the invention are shown. The second preamble set of the partially configured carrier comprises only one secondary preamble. Because the partially configured carrier comprises a lesser number of secondary preambles, the mobile station 304 only needs to check one secondary preamble to identify a target carrier to be a partially configured carrier, and symbols are left for data transmission to increase system capacity. In FIG. 5C, the secondary preamble 552 of the partially configured carrier is transmitted in correspondence with the primary preamble 502 of the fully configured carrier. In FIG. 5D, the secondary preamble 574 of the partially configured carrier is transmitted in correspondence with the first secondary preamble 504 of the fully configured carrier.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A broadcasting system, comprising:
   a transceiver, carrying out signal transmission via at least one fully configured carrier and at least one partially configured carrier; and
   a processor, coupled to the transceiver, controlling the transceiver to broadcast a first preamble set via the at least one fully configured carrier, and controlling the transceiver to broadcast a secondary preamble set via the at least one partially configured carrier,
   wherein the first preamble set comprises a primary preamble and at least one secondary preamble, and the second preamble set comprises no primary preamble and at least one secondary preamble;
   wherein the first preamble set comprises the primary preamble and three secondary preambles sequentially transmitted in each frame of the at least one fully configured carrier, wherein the primary preamble is transmitted at a start of each frame of the at least one fully configured carrier;
   wherein the second preamble set comprises four secondary preambles sequentially transmitted in each frame of the at least one partially configured carrier, and the four secondary preambles of the secondary preamble set are respectively transmitted in correspondence with the primary preamble and the three secondary preambles of the first preamble set;
   wherein the secondary preamble first transmitted in the secondary preamble set has a different code sequence with those of the other three secondary preambles in the secondary preamble set.

2. The broadcasting system as claimed in claim 1, wherein the second preamble set comprises two secondary preambles sequentially transmitted in each frame of the at least one partially configured carrier, and the two secondary preambles of the second preamble set are respectively transmitted in correspondence with the primary preamble and a second one of the three secondary preambles of the first preamble set.

3. The broadcasting system as claimed in claim 1, wherein the second preamble set comprises two secondary preambles sequentially transmitted in each frame of the at least one partially configured carrier, and the two secondary preambles of the second preamble set are respectively transmitted in correspondence with a first one and a third one of the three secondary preambles of the first preamble set.

4. The broadcasting system as claimed in claim 1, wherein the second preamble set comprises only a secondary preamble transmitted in each frame of the at least one partially configured carrier.

5. The broadcasting system as claimed in claim 1, wherein the primary preamble has a double repeated time-domain waveform characteristic, and the secondary preambles of the first preamble set and the second preamble set do not have the double repeated time-domain waveform characteristic.

6. The broadcasting system as claimed in claim 1, wherein the primary preamble is a Zadoff Chu code or a generalized chirp like code.

7. The broadcasting system as claimed in claim 1, wherein the primary preamble is a frequency-domain interleaved preamble.

8. The broadcasting system as claimed in claim 1, wherein the transceiver uses MIMO-scheme cyclic delay diversity to generate the primary preamble and the secondary preambles of the first preamble set and the second preamble set.

9. The broadcasting system as claimed in claim 1, wherein the secondary preambles of the first preamble set and the second preamble set are Zadoff Chu codes or generalized chirp like codes.

10. The broadcasting system as claimed in claim 1, wherein the transceiver uses a frequency switching time division (FSTD) MIMO scheme to generate the second preamble set of the at least one partially configured carrier.

11. A multi-carrier communication system, comprising:
    a plurality of carriers, divided into at least one fully configured carrier and at least one partially configured carrier;
    a base station, broadcasting a first preamble set via the at least one fully configured carrier, and broadcasting a secondary preamble set via the at least one partially configured carrier, wherein the first preamble set comprises a primary preamble and at least one secondary preamble, and the second preamble set comprises no primary preamble and at least one secondary preamble; and
    a mobile station, selecting a target carrier from the carriers, detecting whether the primary preamble is received from the target carrier, and determining the target carrier to be the fully configured carrier when the primary preamble is detected from the target carrier;
    wherein the first preamble set comprises the primary preamble and three secondary preambles sequentially transmitted in each frame of the at least one fully configured carrier, wherein the primary preamble is transmitted at a start of each frame of the at least one fully configured carrier;

wherein the second preamble set comprises four secondary preambles sequentially transmitted in each frame of the at least one partially configured carrier, and the four secondary preambles of the secondary preamble set are respectively transmitted in correspondence with the primary preamble and the three secondary preambles of the first preamble set; and wherein the secondary preamble first transmitted in the secondary preamble set has a different code sequence with those of the other three secondary preambles in the secondary preamble set.

12. The multi-carrier communication system as claimed in claim 11, wherein the mobile station determines the target carrier to be the partially configured carrier when the primary preamble is not detected from the target carrier.

13. The multi-carrier communication system as claimed in claim 12, wherein when the target carrier is determined to be the partially configured carrier, the mobile station selects a second target carrier to be monitored from the carriers and determines whether the second target carrier is the fully configured carrier by detecting whether the primary preamble is received from the second target carrier.

14. The multi-carrier communication system as claimed in claim 11, wherein the second preamble set comprises two secondary preambles sequentially transmitted in each frame of the at least one partially configured carrier, and the two secondary preambles of the second preamble set are respectively transmitted in correspondence with the primary preamble and a second one of the three secondary preambles of the first preamble set.

15. The multi-carrier communication system as claimed in claim 11, wherein the second preamble set comprises two secondary preambles sequentially transmitted in each frame of the at least one partially configured carrier, and the two secondary preambles of the second preamble set are respectively transmitted in correspondence with a first one and a third one of the three secondary preambles of the first preamble set.

16. The multi-carrier communication system as claimed in claim 11, wherein the second preamble set comprises only a secondary preamble transmitted in each frame of the at least one partially configured carrier.

17. The multi-carrier communication system as claimed in claim 13, wherein the primary preamble has a double repeated time-domain waveform characteristic, and the secondary preambles of the first preamble set and the second preamble set do not have the double repeated time-domain waveform characteristic.

18. The multi-carrier communication system as claimed in claim 13, wherein the primary preamble is a Zadoff Chu code or a generalized chirp like code.

19. The multi-carrier communication system as claimed in claim 13, wherein the primary preamble is a frequency-domain interleaved preamble.

20. The multi-carrier communication system as claimed in claim 13, wherein the base station uses MIMO-scheme cyclic delay diversity to generate the primary preamble and the secondary preambles of the first preamble set and the second preamble set.

21. The multi-carrier communication system as claimed in claim 13, wherein the secondary preambles of the first preamble set and the second preamble set are Zadoff Chu codes or generalized chirp like codes.

22. The multi-carrier communication system as claimed in claim 13, wherein the base station uses a frequency switching time division (FSTD) MIMO scheme to generate the second preamble set of the at least one partially configured carrier.

* * * * *